(12) United States Patent
Vornsand

(10) Patent No.: US 6,212,679 B1
(45) Date of Patent: *Apr. 3, 2001

(54) EXTERNAL CONTROL OF PARENTAL CONTENT CONTROLS IN INSTITUTIONAL TELEVISION RECEIVERS

(75) Inventor: Steven J. Vornsand, Lake in the Hills, IL (US)

(73) Assignee: Zenith Electronics Corporation, Lincolnshire, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,711

(22) Filed: Dec. 10, 1998

(51) Int. Cl.[7] .................................................. H04N 7/00
(52) U.S. Cl. ............................ 725/25; 725/37; 725/78
(58) Field of Search ........................... 348/5.5, 506, 503, 348/10, 12; 725/25, 37, 78

(56) References Cited

U.S. PATENT DOCUMENTS

| Re. 35,859 | | 7/1998 | Gardner et al. ....................... 348/553 |
|---|---|---|---|
| 4,605,964 | * | 8/1986 | Chard .................................... 348/461 |
| 5,382,983 | * | 1/1995 | Kwoh et al. .......................... 348/176 |
| 5,630,119 | * | 5/1997 | Aristides et al. ..................... 395/601 |
| 5,828,402 | * | 10/1998 | Collings ................................ 348/5.5 |
| 5,973,683 | * | 10/1999 | Cragan et al. ....................... 345/327 |
| 5,995,133 | * | 11/1999 | Kim ...................................... 348/5.5 |
| 6,072,520 | * | 6/2000 | Yuen et al. ............................ 348/5.5 |

\* cited by examiner

*Primary Examiner*—Andrew Faile
*Assistant Examiner*—Reuben M. Brown

(57) ABSTRACT

An institutional television receiver includes parental content controls for selectively blocking television signals based upon encoded ratings therein. The television receiver is coupled to a control center via a communications path. User preferences regarding the parental content controls are set, enabled, and disabled from the control center. User commands are supplied from the television receiver to the control center which, in turn, sends appropriate commands back to the receiver for controlling it.

2 Claims, 1 Drawing Sheet

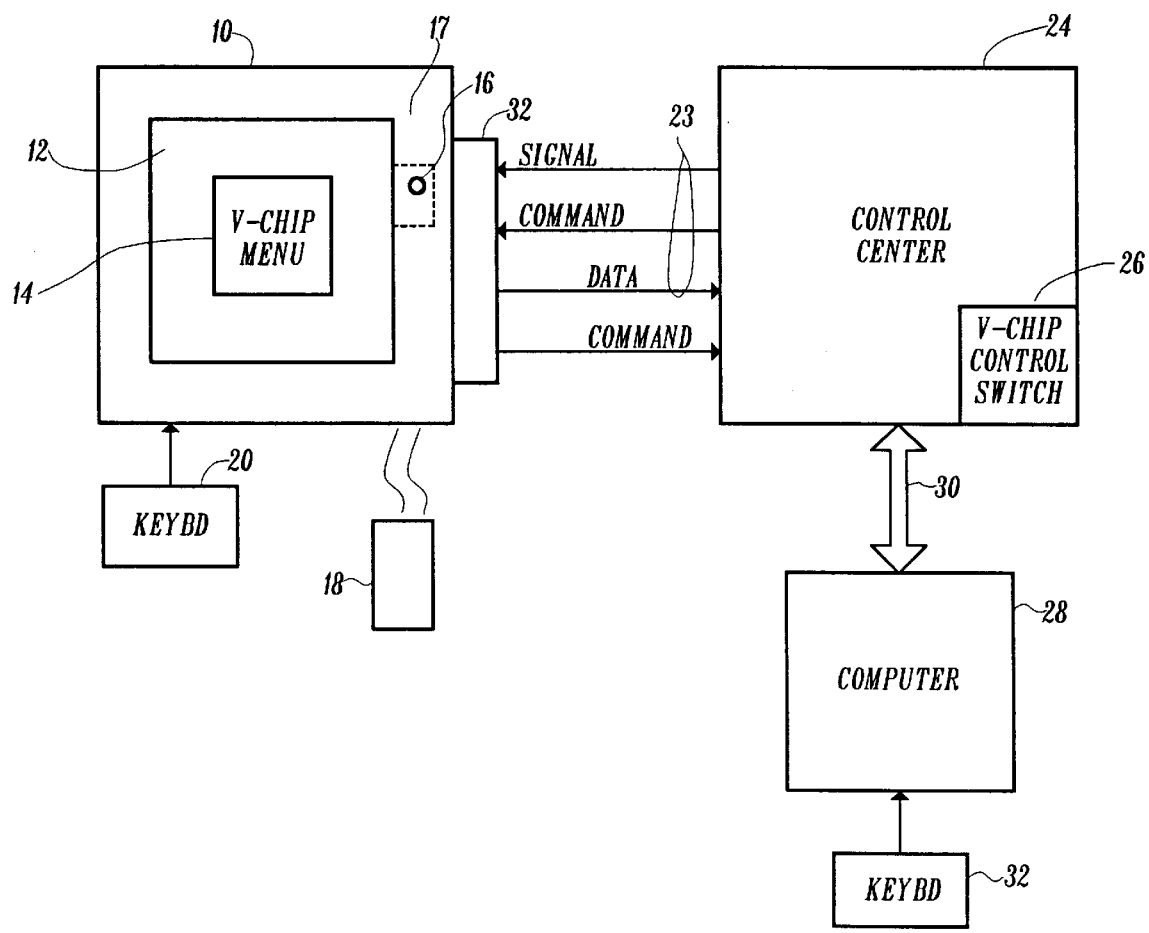

EXTERNAL CONTROL OF PARENTAL CONTENT CONTROLS IN INSTITUTIONAL TELEVISION RECEIVERS

BACKGROUND OF THE INVENTION AND PRIOR ART

This invention relates generally to television receivers and particularly to so-called institutional television receivers that are controllable, in some degree, from control centers. Institutional television receivers as used herein include, without limitation, television receivers that are used in hotels, motels, hospitals, prisons, schools, and the like.

Many television receivers, such as those manufactured by the assignee of this invention, include a communications port that enables the television receiver to "talk to" an external device or control center. In this connection, an external device or control center is considered to be any system or machine that provides control of the television receiver through the television receiver's data communications port. Function controls and program material may be supplied to the television receiver from the control center. The television receiver may also be used as an input device for the control center to receive information and commands from the user/viewer. An example is a hotel receiver, where in-house displays and messages may be presented to the user/viewer on certain channels, pay-per-view-programs on different channels, conventional programming on other channels and special services on still other channels. The channels made available to the television receiver are determined by the control center. In many arrangements, the user does not directly control the television receiver. For example, an ON/OFF command from a remote control device or other television receiver input, may send a signal to the control center, where the information is decoded and an appropriate command sent back to activate the television receiver, tune it to a particular channel, and display preselected material on the viewing screen. The user, in most instances, is unaware of the fact that functioning of the television receiver is actually being dictated from a control center at a remote location.

Recently, legislation has been enacted regarding a so-called V-chip for enabling supervisory control of signals that are receivable by the receiver in accordance with rating codes that are to be imbedded in the television signals. The term V-chip is a misnomer in that it implies a single chip or circuit arrangement whereas the controls may be implemented in different portions of the receiver. A much more explicit term is "parental content control", which will be used hereinafter interchangeably with the term V-chip. The parental content control feature is designed to enable parents to automatically block certain types of television signals from being processed by a television receiver. The parental content control functions may be individually determined by the authorized user, which in most instances will be the parent. This may be accomplished by accessing an appropriate menu on the viewing screen and establishing the desired criteria for viewing based upon the ratings embedded in the television signals. The criteria selections are password protected so that they may not be changed by unauthorized viewers. The selections may also be time-limited so as to provide blocking of certain types of television signals for a specific period of time, after which the blocking criteria is automatically removed.

The present invention is directed to the use of such television receivers in institutional settings, most especially in hotels and motels. It envisions a user determining the viewing criteria in the same manner that he would for a television receiver in his own home, except that the actual control of the receiver and viewing criteria is in under the purview of a control center. The viewer would thus set his preferences and password and any time restraints as usual.

OBJECTS OF THE INVENTION

A principal object of the invention is to provide a novel institutional television receiver system.

Another object of the invention is to provide a method and apparatus for enabling user control of parental content control features of an institutional television receiver.

BRIEF DESCRIPTION OF THE DRAWINGS

These and other objects and advantages of the invention will be apparent upon reading the following description in conjunction with the drawing, the single FIGURE of which is a simplified block diagram illustrating the method and apparatus of the invention.

DESCRIPTION OF THE PREFERRED EMBODIMENT

Referring to the drawing, a television receiver 10 includes a viewing screen 12, upon which may be displayed a V-chip menu 14 allowing user selection or enablement of parental content controls for the television receiver. A remote control receiving device 16 is coupled to an associated remote control receiver apparatus 17 (illustrated in dotted lines) that receives various function command signals from a remote control transmitter 18, all of conventional construction. A separate keyboard 20 is shown to indicate that function command signals for the television receiver may be inputted by key punches as well as remote signals or commands. It will be appreciated that television receiver 10 includes parental content controls that enable its circuitry to block certain types of incoming television signals based upon embedded ratings that are encoded in the television signals. A communications port 22, generally situated on the rear of the television receiver, enables the transmission and reception of various signals, commands and data over a plurality of wires, comprising a communications path 23, in accordance with any well known signal and data transmission protocol. Such arrangements are known in the art and need not be discussed further. Communications path 23 is coupled to a control center 24 that includes a V-chip control switch 26 for generating and transmitting the appropriate television commands to establish the settings or criteria for the parental content controls of television receiver 10 as selected by the user or keyboard input. It will be appreciated that the user perceives that the parental content controls are enabled or set in the same manner as they would be were the television receiver being operated in a non-institutional environment. A computer 28 is interconnected with control center 24 by means of a bidirectional communications link 30. Computer 28, in turn, may be accessed and controlled from a keyboard 32 that is coupled thereto.

In practice, a user operates television receiver 10 by means of remote transmitter 18 or keyboard 20 in a normal manner. Commands or signals for controlling the various functions of the television receiver are however, in general, routed along communication path 23 to control center 24 that, in turn, is programmed or controlled by computer 28 to respond with appropriate control commands to the television receiver via the communication path 23. Should the user wish to establish criteria for parental content control, the V-chip menu 14 is accessed by operation of appropriate keys on remote transmitter 18 or keyboard 20. The signal is supplied to control center 24 and a suitable command returned to the television receiver to V-chip menu 14. User selections of the parental content control settings are similarly processed by the control center. In this manner, the user may establish his viewing preferences, while the control center retains control of the television receiver. This enables the control center to override user preferences, passwords, time out limitations, etc. that would otherwise restrict subsequent users from full use of the television receiver. It also enables the control center to impose preset arbitrary operational criteria on the television receiver in the absence of user selected criteria, should that be desirable.

With the invention, various levels of control features may be provided. For example, a minimal system might permit control of the password reset. An advanced system might include enable or disable access to the parental content control features. A still more advanced system could also control the values of the parental content controls and an elaborate system could invoke television receiver parental controls menus along with control center on-screen displays.

What has been described is a novel institutional television receiver system that permits the implementation of user settings of parental content controls. It is recognized that numerous changes to the described embodiment of the invention will be apparent without departing from its true spirit and scope. The invention is to be limited only as defined in the claims.

What is claimed is:

1. A method of operating a television receiver, including a communications port, and equipped with parental content controls for blocking signals based upon encoded ratings therein, in an institutional environment, which includes a separate control center, external to the television receiver and connected thereto via a cable connection, for controlling the television receiver via the communications port, comprising:

interactively coupling the television receiver to the external control center via the communications port and the cable connection;

setting, enabling and disabling the parental content controls in the television receiver from the external control center via the communications port; and enabling a user to determine the settings, and the enabling and the disabling of the parental content controls in the television receiver via the external control center and the communications port, the enabling step further comprising;

launching a request from the user to the television receiver for access to a parental content controls menu;

supplying the request from the television receiver to the external control center;

enabling the parental content controls menu in the television receiver from the external control center; and repeating the above steps to establish the parental content controls preferences of the user in the television receiver.

2. An institutional environment television system comprising:

a television receiver, including a communications port, and having parental content controls for selectively blocking television signals based upon encoded program ratings therein;

a control center, external to said television receiver and connected to said communications port via a cable forming a signal and data path, for controlling said television receiver from said external control center;

means for setting, enabling, and disabling said parental content controls in said television receiver from said external control center via said signal and data path, and wherein said enabling means comprises:

signal control means for launching a user request from said television receiver for access to a parental controls menu;

means for supplying said user request and user enabling signals to said external control center over said signal and data path; and means for establishing user preferences from said parental content menu from said external control center via said signal and data path.

* * * * *